Figure 1:
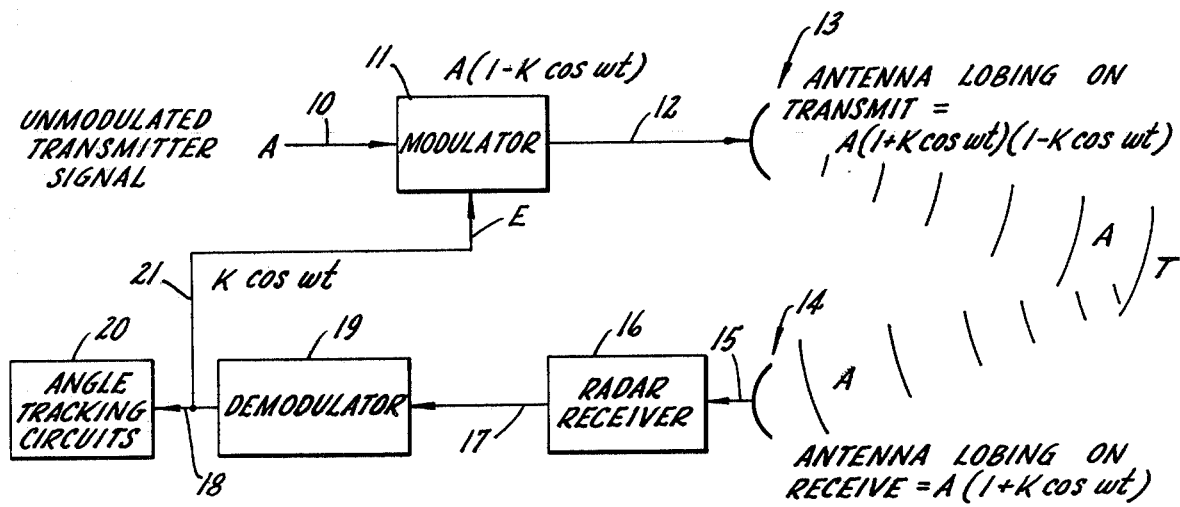

United States Patent
Holman

[11] 4,183,023
[45] Jan. 8, 1980

[54] ANTI-JAM DEVICE FOR A CONICAL SCAN TRACKING RADAR

[75] Inventor: James G. Holman, Baltimore, Md.

[73] Assignee: The United States of America as represented by the Secretary of the Navy, Washington, D.C.

[21] Appl. No.: 189,214

[22] Filed: Apr. 20, 1962

[51] Int. Cl.² ............................................. G01S 7/36
[52] U.S. Cl. .................................................. 343/18 E
[58] Field of Search ....................... 343/18, 16, 7, 7.9, 343/17.5, 16, 18 E

[56] References Cited
U.S. PATENT DOCUMENTS

| 3,896,438 | 7/1975 | Schrader, Jr. | 343/18 E |
| 3,947,847 | 3/1976 | Felsenthal, Jr. | 343/18 E |
| 4,107,682 | 8/1978 | Boucher et al. | 343/18 E X |
| 4,107,683 | 8/1978 | Neri et al. | 343/18 |

Primary Examiner—T. H. Tubbesing
Attorney, Agent, or Firm—R. S. Sciascia; Paul S. Collignon

EXEMPLARY CLAIM

1. An anti-jam device for conical scan tracking radar comprising:
   an input circuit to a conical scanning radar antenna for transmitting signals into the atmosphere, said signals appearing effectively unmodulated when viewed from a target;
   a radar receiver for receiving echo signals from said target;
   a modulator circuit coupled to said input circuit; and
   means coupling said receiver to said modulator circuit to apply said received echo signals to said modulator circuit as a divider of radio frequency energy whereby the amplitude modulation produced by the conical scanning radar antenna on the transmitted signals appears effectively eliminated when said signals are viewed from said target.

5 Claims, 1 Drawing Figure

ANTI-JAM DEVICE FOR A CONICAL SCAN TRACKING RADAR

This invention relates to radar countermeasures and more particularly to an anti-jam device for a conical scan tracking radar which divides the radar transmitted pulse or continuous wave signal energy by the received amplitude modulated echo error signal energy to provide unmodulated transmitted signals to illuminate the target rendering ineffective any angle deception repeater carried by the target to repeat deceptive echo signals back to the tracking radar.

Tracking radar systems employing the conical scanning or lobing principle of angle tracking are susceptible to jamming by a particular class of repeater jammers known as angle deception repeaters. The conical scanning or lobing radars generate amplitude modulation of the radar signals by displacing the antenna beam center around the center line of the antenna. If the target is displaced in angle from the center line of the antenna, then the returned radar pulses are amplitude modulated at the displacement or "lobing" rate. The phase of the amplitude modulation with respect to the antenna displacement tells the direction of the target angular error and the amplitude tells the amount of the target angular error. The antenna beam is displaced at a rate below the pulse repetition frequency (PRF) of the radar and remains displaced both during transmission and reception of the radar energy. This means that with respect to the radar pulses received at the targets amplitude modulation exists.

The angle deception repeater measures the amplitude modulation on the radar pulses and changes the phase by approximately 180° and remodulates the radar pulses which it is repeating. This causes the radar angle tracking loop in the radar angle tracking radar to be driven in the wrong direction by the error signals and results in the angle tracking radar unlocking or the antenna circling around the actual target bearing.

In prior known devices simultaneous lobing radar or monopulse radar is used in which amplitude modulation does not exist at the target. This solution requires a considerably more complex radar with four antenna lobes, radio frequency (RF) combining networks, and three intermediate frequency (IF) amplifiers. Another known means of countering these countermeasures is in the use of switching techniques in the antenna which prevent lobing of the antenna beam during transmission of the radar energy but allow lobing on receive. These techniques generally result in a loss of antenna gain, increased side lobe levels, inreased crossed polarization, and a reduced frequency band over which the antenna is useful. In addition, the switching devices are such that it is very difficult to use the antenna to transmit pulse and continuous wave (CW) energy at the same time.

In the present invention the amplitude modulation on the radar pulses received at the target is eliminated by dividing the transmitted pulses before they are radiated at the antenna by the amplitude modulated echo signals received at the radar from the target. This is accomplished by placing a modulator or division component in the waveguide structure between the radar transmitter and the radar transmitting antenna. The received echo radar signals, which are conducted through a demodulator to the angle tracking circuits, are likewise applied to the modulator or division component in the transmission circuit as an energy divider to cancel out amplitude modulation and antenna lobing of the transmitted radar pulses or CW to eliminate transmitted information upon which an angle deception repeater may rely for producing deceptive echo signals. It is therefore a general object of this invention to provide an anti-jam device for use with conical scan tracking radar systems to prevent the use of the transmitted radar pulses or CW in an enemy angle deception repeater means to produce falsified repeated echo signals thereby preventing countermeasures against the effectiveness of conical scan tracking radar systems.

Figure 2:
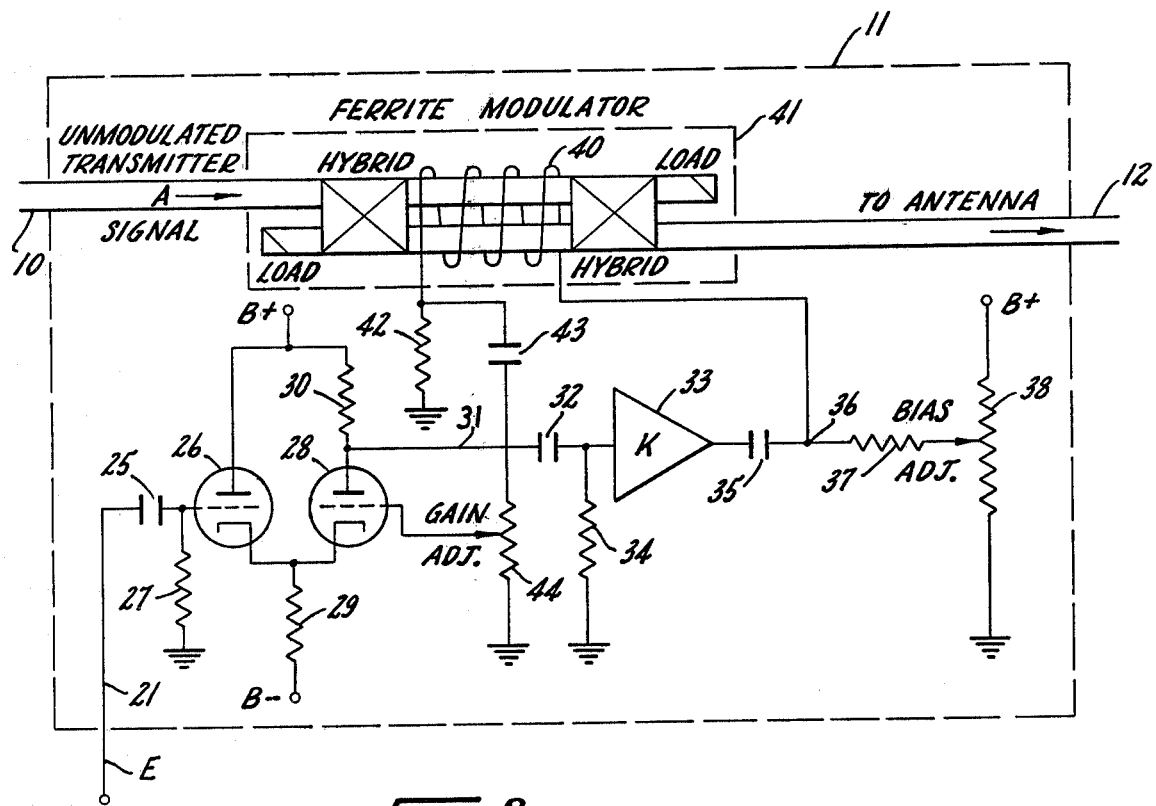

These and other objects, advantages, features, and uses may become more apparent to those skilled in the art as the description proceeds and considered along with the accompanying drawing, in which:

FIG. 1 is a block schematic circuit of the transmitter and receiver components illustrated along with the circuit incorporating the anti-jam modulator circuit of this invention, and FIG. 2 is a circuit schematic diagram of a suitable embodiment of a modulator circuit.

Referring more particularly to FIG. 1 of the drawing, a radar transmitter (not shown) develops unmodulated transmitter signals A which include inherently by the signal amplituude of the carrier and are applied by way of the waveguide conductor means 10 to a modulator or energy division component 11, the output of which is through a waveguide conductor means 12 to the transmitting antenna 13. A radar receiving antenna 14 is illustrated as positioned to receive any radar echo signals from a target T reflected back from the RF energy transmitted from the radar antenna 13. The received echo RF energy is conducted by the conductor means 15 to a radar receiver 16, the output of which is by way of the conductor means 17 through a demodulator 19 and by way of the conductor means 18 to the angle tracking circuits 20 of the radar, as is well understood by those skilled in the radar art. The transmitting and receiving antennas 13 and 14 are of the conical scanning type synchronized in operation to cause the RF energy to be lobed in a circular manner about the antenna center line. It is also to be understood that a single antenna may be used with a transmit-receive switch therein to transmit and receive the RF energy as is well understood by those skilled in the radar art.

In accordance with this invention the received RF energy at the receiver 16 is conducted as video echo error signal information in the conductor means 17 to the demodulator 19. A feedback coupling is connected to the output conductor means 18 of the demodulator 19 by a conductor means 21 on which the echo error signal information, designated as E, is conducted. The modulator component 11 may be of any well-known device, more particularly described with reference to FIG. 2, to modulate the unmodulated transmitter signal A by the received echo signal E.

Referring more particularly to FIG. 2, the demodulator 11 is shown within broken lines having the unmodulated transmitter signal input at 10 and the modulator output at 12 to the antenna 13. The echo signal voltage information E is applied by way of conductor means 21. The error voltage E is applied through a capacitor 25 to the grid of a first triode 26 (or the first triode section of a double triode) which is grounded through a grid biasing resistor 27. The elements 25 and 27 block the direct current carrier component from the modulator circuit 11. The anode of triode 26 is coupled directly to an anode voltage source B+ while the cathode of triode 26, together with a cathode of a triode 28, is coupled through a cathode load resistor 29 to a negative cathode voltage source. The triode 26 operates as a cathode follower tube, the cathode voltage therefrom being applied to the cathode of triode 28. The anode of triode 28 is coupled through an anode load resistor 30 to the B+ source with an output conductor 31 connected directly to the anode to amplify the signals from cathode input to anode output, the triodes 26 and 28 (or a twin triode) operating as a differential amplifier. The anode output 31 is connected through a coupling capacitor 32 to an alternating current amplifier 33, the input being biased to a ground point through a resistor 34. The amplifier output is through a coupling resistor 35 to a terminal point 36. The terminal point 36 is coupled through a resistor 37 to an adjustable tap of a biasing potentiometer 38, the resistance element thereof being connected across a direct current source, one terminal of which is in common with ground potential. The terminal point 36 is connected to one terminal of an electrical coil 40 around the waveguide structure of a ferrite modulator 41. The opposite terminal of coil 40 is connected to ground through a resistor 42 and also through a coupling capacitor 43 and the resistance element of a potentiometer 44 to ground potential. The adjustable tap of potentiometer 44 is coupled to the grid of the triode 28 to adjust the gain of this tube to control the amplitude of the error signal and at the same time feeds back a sample of the coil 40 output current to make it an undistorted reproduction of the input E voltage and thus reduce the distortion of the amplifier 33.

The ferrite modulator 41 has a hybrid junction on opposite sides of the coil 40 with load termination extensions on each hybrid junction. A biasing current is established through the coil 40 in accordance with the position of the adjustable tap on potentiometer 38. This current is varied in accordance with the alternating current error voltage E applied at terminal point 36 to rotate the wave propagation of the unmodulated transmitted signals to variably divide this RF energy between the terminal loads and the output 12 to antenna 13. The direct current from biasing source 38 is connected to the coil 40 in a polarity relation to produce the division or modulation in the proper phase when the error signal is superimposed thereon. The ferrite modulator 41 thereby divides the RF energy or modulates the unmodulated transmitted RF energy by the echo error signal energy to produce a modulation of the transmitted RF energy by an amplitude equal in amount and opposite in phase to the modulation which will be produced by antenna lobing or by reason of the target being off the center of conical scan by the antenna.

In the operation of the anti-jam device, reference is again made to FIG. 1 with occasional reference to FIG. 2. An unmodulated transmitter signal A which includes inherently the signal amplitude of the carrier, is conducted through the waveguide 10 to the modulator component 11. The echo error voltage E is applied by conductor 21 to the modulator component 11, the error voltage E being equal to K cos wt, as will be developed hereinbelow, where K is the constant describing amplitude, w is the antenna lobing frequency, and t is the time factor. The E voltage K cos wt is applicable on the coil 40 circuit to modulate the signal A which, for the proper polarity connection, produces A(1−K cos wt) on the output 12 to the antenna 13 where the "1" is representative of the carrier direct current component and is a function of the bias set in at 38.

The amplitude modulation produced by antenna 13 lobing will be (1+B cos wt), where B is a constant slightly different in value from K. The difference between B and K is proportional to the change in angular error that occurs during the time it takes to pass a signal from the target to the radar, through the radar antenna 14, the receiver 16, the demodulator 19, the modulator 11, the antenna 13, and back to the target. The major portion of this time delay is associated with the finite bandwidth of the modulator circuit 11. In a practical system, this bandwidth can be made large and its time delay small compared to the time required for the target to move in such a manner that it generates a significant error signal. For a practical design, it is expected that modulation percentages generated by the difference between B and K would be less than one percent.

If target T is off the center of antenna 13 lobing, the signal (1+B cos wt) produced by antenna 13 lobing and the signal E, or K cos wt, coming by way of conductor 21 and capacitor 25 to generate the amplitude modulated signal A(1−K cos wt) on the modulator output 12, produce the transmitted signal expressed as A(1−K cos wt) (1+B cos wt). However, in a practical radar tracking system the difference in value between K and B is very small, as stated and derived above, and is generally considered insignificant and for the purpose of explanation herein K and B will be considered equal. The above expression of the transmitted signal may be written as te following equation:

$$A(1-K\cos wt)(1+K\cos wt)=A(1-K^2\cos^2 wt)$$

Since the factor $K^2 \cos^2 wt$ is of second order, it is representative of a harmonic which is of little effect as a component of the transmitted signal and is disregarded. Disregard of the harmonic component reduces the transmitted signal to the unmodulated carrier signal A arriving at the target T. The unmodulated carrier signal A is reflected back off of target T as an echo carrier signal A which is amplitude modulated by the receiving conical scanning antenna 14 to produce the amplitude modulated signal A(1+K cos wt), still assuming that the target T is off the lobing axis. This received signal A(1+K cos wt) is an RF signal that is demodulated by demodulator 19 to detect the envelope of signal A(1+K cos wt) on its output 18 consisting of a direct current component and an alternating current component. The direct current component is used in the normal radar for automatic gain control (not shown), as well understood by those skilled in the art, and the alternating current component is used in the tracking circuits as well as being conducted to the modulator 11. However, the capacitor 25 and the resistor 27 block the direct current component so that the modulator 11 only receives the signal K cos wt which is directly representative of the modulations generated by the antenna 14 and existing on the received signal.

Accordingly, the target will see an unmodulated RF carrier signal A, the second harmonics being so small as to be negligible, while the demodulator 19 will experience demodulation of the echo unmodulated signal A modulated by the antenna 14 lobing. As viewed at the target, the unmodulated transmitted RF carrier signal A is continuously modulated by an amount which will be substantially eliminated by oppositely phased modulation of equal amplitude produced by antenna 13 lobing during conical scan. This is the desired result since enemy angle deception repeaters do not have the angle information in the unmodulated carrier signal A necessary to re-transmit erroneous or deceptive tracking signals to own radar carrying the invention. The amplitude of the modulating error signal E can be adjusted at the potentiometer 44 to substantially eliminate all modulation of the transmitted signal, as viewed from the target T. The bias adjusting potentiometer 38 can be controlled to obtain zero modulation for targets on the center line of the antenna lobing oscillations and thus calibrate the device for proper operation.

The important feature of this invention is in the inclusion of a modulator component of the transmitter channel which produces a division of the RF energy between output and load absorbers, with a feedback coupling from the receiver in the receiver channel to effectively cancel out transmitted radar modulation information, when viewed from the target, which could be used by enemy deception repeaters contained in the target. This cancelling modulation can be accomplished with any device capable of varying the amplitude of the transmitter RF pulses or CW. Well known modulation component devices may be used such as ferrite attenuators, power dividers which may divide the transmitter power between the antenna and a dummy load, mechanically controlled phase shifters or attenuators in the waveguide following the transmitter, or any other device for controlling the pulse or CW energy to vary the amplitude and phase of the RF energy supplied to the transmitter antenna. The modulator component may take any of the above-mentioned forms and be performed by various degrees of accuracy depending on the application used. Energy division may be approximated by the first terms of a series which can be generated through a simple subtraction process. Increased accuracy can be obtained in the transmitter modulation scheme by sampling the modulated RF pulses and comparing their modulation with the desired modulating signal. Any of the well-known forms of ferrite attenuators, power dividers, or phase shifters, may be used as hereinabove described such as those disclosed and described in the text of "Principles and Applications of Waveguide Transmission" by George C. Southworth, Third printing, December 1956, Chapter 9. Ferrite modulation control through electric circuitry may be accomplished by devices shown and described in the U.S. Pat. Nos. 2,857,575 and 2,885,677 to Zaleski.

While many modifications and changes may be made in the constructional details, and particularly in the modulation component disclosed by substitution of the various means described, it is to be understood that I desired to be limited in my invention purely by the scope of the appended claims.

I claim:

1. An anti-jam device for conical scan tracking radar comprising:
    an input circuit to a conical scanning radar antenna for transmitting signals into the atmosphere, said signals appearing effectively unmodulated when viewed from a target;
    a radar receiver for receiving echo signals from said target;
    a modulator circuit coupled to said input circuit; and
    means coupling said receiver to said modulator circuit to apply said received echo signals to said modulator circuit as a divider of radio frequency energy whereby the amplitude modulation produced by the conical scanning radar antenna on the transmitted signals appears effectively eliminated when said signals are viewed from said target.

2. An anti-jam device for conical scan tracking radar comprising:
    a radar transmission line to a conical scanning radar antenna for transmitting radar signals into the atmosphere modulated by antenna lobing;
    a modulation circuit in said transmission line to receive said radar signals to produce a result on the output thereof to said antenna modulated from a modulating voltage to effectively reduce the modulation produced on said radar signals by antenna lobing to zero when viewed from a target;
    a radar receiver for receiving radar echo signals, from said target, modulated by antenna lobing and passing the received radar signals as an output thereof; and
    a coupling means coupling the output of said receiver to said modulator circuit as said modulating voltage thereof whereby the radar echo signals transmitted cannot be modulated by a target to allow deceptive repeated signals to be produced as echo signals.

3. An anti-jam device for conical scan tracking radar comprising:
    a radar transmission line to a radar antenna for transmission of radar signals A into the atmosphere, said antenna transmission producing modulation from antenna lobing amounting to $1+K \cos wt$, where K is the contant describing the amount of modulation which occurs at the antenna, w is the antenna lobing frequency, and t is the time factor;
    a modulator circuit in said transmission line to receive said radar signals A therein and to produce from a modulating voltage a modulated signal on an output therefrom to said antenna equal in amplitude and opposite in phase to modulation produced by antenna lobing;
    a radar receiver for receiving radar echo signals E from a target and passing said echo signals to an output thereof, said echo signals having a modulation produced from antenna lobing of $1+K \cos wt$; and p1 a coupling means coupling the output E of said receiver to said modulator circuit as said modulating voltage to produce the modulation cancellation for the transmitted radar signals of antenna modulation thereon as $$A(1-K \cos wt)(1+K \cos wt)$$

or $$A(1-K^2 \cos^2 wt)$$

where the second order harmonics are ineffective and the quantity $$A(1-K^2 \cos^2 wt)$$

becomes A whereby the transmitted signals are modulated when received at the target thereby preventing jamming signal production for deceptive repeaters.

4. An anti-jam device for conical scan tracking radar as set forth in claim 3 wherein said modulator circuit comprises means for varying the amplitude of the modulating voltage.

5. An anti-jam device for conical scan tracking radar comprising:

a radar transmission line to a conical scan tracking radar antenna for transmission of radar signals into the atmosphere, said antenna transmission producing an amplitude modulation on said radar signals by virtue of antenna lobing;

a modulator component in said transmission line to receive said radar signals and to modulate said radar signals, in accordance with an applied modulating voltage, the resulting modulated radar signals being equal in amplitude and opposite in phase to the amplitude modulation produced by antenna lobing to effectively cancel same when viewed at a target;

a radar receiver for receiving radar echo error signals having amplitude modulation produced from antenna lobing in synchronism with transmitted lobing modulation or radar signals;

a demodulator for demodulating said radar echo error signals to produce said modulating voltage; and a coupling means coupling said modulating voltage from said demodulator to said modulator component thereby producing said modulated radar signals to cancel said modulation produced by antenna lobing whereby the transmitted radar signals from said radar conical scan tracking antenna are umodulated when viewed from a target and are thus ineffective at that target area to be reproduced and returned as deceptive radar echo error signals.

* * * * *